(12) United States Patent
Kuo et al.

(10) Patent No.: US 7,114,165 B2
(45) Date of Patent: Sep. 26, 2006

(54) CLAMPING DEVICE FOR AN OPTICAL DISK PLAYER

(75) Inventors: Tsung-Jung Kuo, Kaohsiung (TW); Cheng-Fu Lee, Hsinchu (TW)

(73) Assignee: Lite-On It Corporation, (TW)

( * ) Notice: Subject to any disclaimer, the term of this patent is extended or adjusted under 35 U.S.C. 154(b) by 217 days.

(21) Appl. No.: 10/713,597

(22) Filed: Nov. 14, 2003

(65) Prior Publication Data

US 2004/0107429 A1   Jun. 3, 2004

(30) Foreign Application Priority Data

Nov. 29, 2002   (JP) ............................... 91219386

(51) Int. Cl.
*G11B 17/03* (2006.01)

(52) U.S. Cl. ..................................... 720/706
(58) Field of Classification Search ................ 720/706, 720/704, 723, 724, 604; 360/99.12; 369/270, 369/271, 271.1
See application file for complete search history.

(56) References Cited

U.S. PATENT DOCUMENTS

| | | | | |
|---|---|---|---|---|
| 5,583,717 A | * | 12/1996 | Nakata et al. | 360/99.06 |
| 5,926,452 A | * | 7/1999 | Park | 720/706 |
| 5,933,408 A | * | 8/1999 | Park et al. | 720/706 |
| 6,552,993 B1 | * | 4/2003 | Huang | 720/712 |
| 6,845,511 B1 | * | 1/2005 | Kuo et al. | 720/706 |
| 2004/0117808 A1 | * | 6/2004 | Tuchiya | 720/619 |

* cited by examiner

*Primary Examiner*—Allen Cao
(74) *Attorney, Agent, or Firm*—Raymond Sun

(57) ABSTRACT

An optical disk player has a clamping device which includes a substrate, a support frame that is pivotably coupled to the substrate, a gripping plate carried on the support frame and extending into the opening, and a slider coupled for slidable movement on the substrate. The slider has a block with an angled surface along which a projecting tab on the support frame travels when the slider is moved. The slider also has a pressing tab that presses the gripping plate through the opening to fix a disk on to a turntable of the disk player.

16 Claims, 5 Drawing Sheets

CLAMPING DEVICE FOR AN OPTICAL DISK PLAYER

BACKGROUND OF THE INVENTION

1. Field of the Invention

The present invention relates to an optical disk player, and in particular, to a clamping device for an optical disk player. In particular, the present invention relates to a clamping device that uses a pressing tab of a sliding mechanism to limit the rotation of a pivoting support frame to ensure the gripping operation of the gripping plate and to increase the stability of the gripping plate when the optical disk rotates.

2. Description of the Prior Art

In recent years, with the continuous development of peripheral equipment for computers and the gradual drop in prices, optical disk players have become standard equipment in personal computers (PCs), and have become an indispensable part of an audio system.

Since an optical disk player is a device that reads the data stored on an optical disk in an optical manner, the optical disk must be positioned accurately on the turntable so that the optical head can read the data at any time. The position of an optical disk can be fixed in two ways: by positioning the optical disk downwards with an upper clamp, or by positioning the optical disk upwards with a lower clamp. In the conventional suction type of optical disk player that is currently available on the market, the clamping device uses an upper clamp to fix the position of an optical disk downwardly. However, there is no mechanism in the conventional technology that can effectively fix the position of the pivoting support frame of the clamping device. Therefore, when the pivoting support frame is in operation, unnecessary vibration may occur during the process of clamping the optical disk. As a result, the gripping plate of the clamping device might be separated from the optical disk by an external force. Consequently, the clamping device would not be able to fix the optical disk on the turntable.

SUMMARY OF THE DISCLOSURE

It is an objective of the present invention to provide an improved clamping device for an optical disk player.

It is another objective of the present invention to provide a clamping device for an optical disk player that limits the pivoting motion of the pivoting support frame to prevent the gripping plate of the clamping device from being separated from the optical disk, so that the loaded optical disk can be stably clamped together with the turntable of the optical disk player to increase the stability of the gripping plate when the optical disk is rotated.

In order to accomplish the objects of the present invention, the present invention provides an optical disk player having a clamping device which includes a substrate, a support frame that is pivotably coupled to the substrate, a gripping plate carried on the support frame and extending into the opening, and a slider coupled for slidable movement on the substrate. The slider has a block with an angled surface along which a projecting tab on the support frame travels when the slider is moved.

The slider also has a pressing tab that presses the gripping plate through the opening to fix a disk on to a turntable of the disk player. The pressing tab limits the pivoting motion of the pivoting support frame to prevent the gripping plate of the clamping device from being separated from the disk, so that the loaded disk can be stably clamped together with the turntable of the optical disk player to increase the stability of the gripping plate when the optical disk is rotated.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1–4 illustrate the clamping device for an optical disk player according to the present invention. The clamping device includes a substrate 1, a slider 2, a pivoting support frame 3, and a gripping plate 4.

Figure 9:
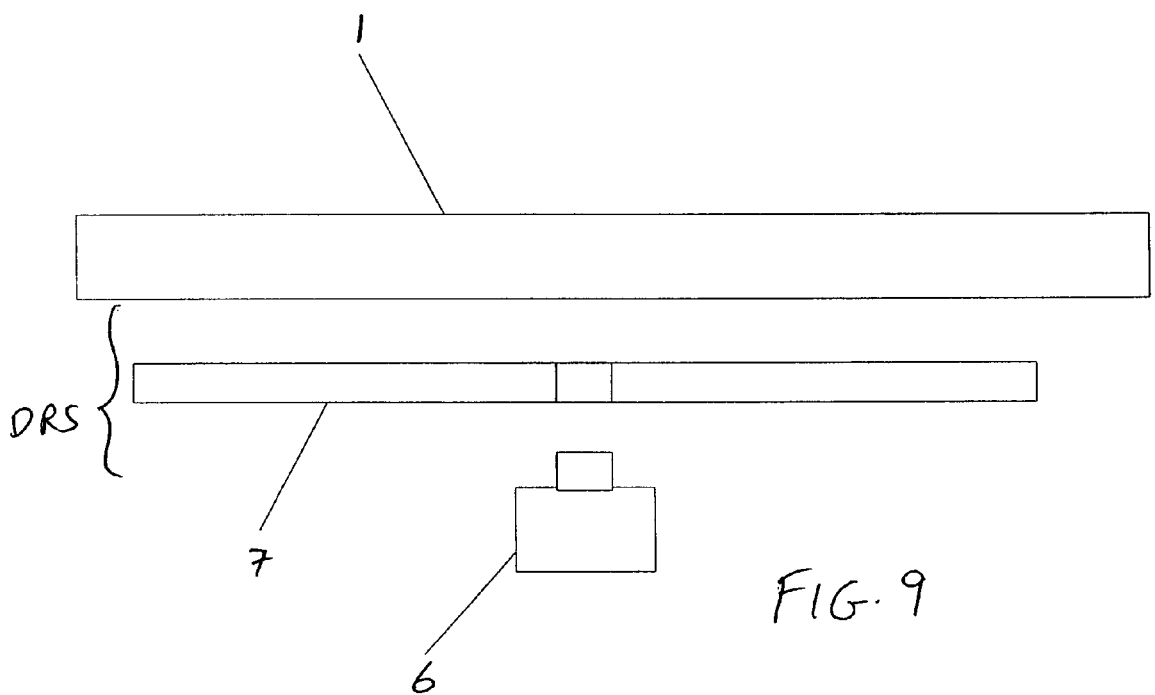
FIG. 9 illustrates the disk receiving space for the optical disk player of FIG. 1

The substrate 1 has a clamp opening 10, fixed guide rods 11, and a pin-hinge frame 12. The fixed guide rods 11 includes a first fixed guide rod 110 and a second fixed guide rod 111. A conventional gear system 13 is provided along a side edge 14 of the substrate 1 for controlling the insertion and ejection of the optical disk. The gear system 13, its components and its operation are well-known in the art, and are not described in greater detail herein. In addition, a guide mechanism 5 is provided adjacent the rear of the substrate 1. The guide mechanism 5, its components and its operation are well-known in the art, and are not described in greater detail herein. As best shown in FIG. 9, a disk receiving space DRS is defined between the substrate 1 and the turntable 6. The disk receiving space DRS is adapted to receive and retain a disk 7.

Referring to FIGS. 1–5, the slider 2 is provided in the form of a plate and has two guide slots 20, a pressing tab 21, and a wedge block 22. The two guide slots 20 include a first guide slot 200 and a second guide slot 201 that are adapted to receive the first fixed guide rod 110 and the second fixed guide rod 111, respectively. The pressing tab 21 and the wedge block 22 are provided in spaced-apart manner along one (i.e., the same) side 23 of the slider 2. The wedge block 22 has a sliding top surface 220 and a sliding angled surface 221. In addition, an L-shaped hooked piece 24 extends from adjacent a side 25 that is opposite to the side 23. The hooked piece 24 is operatively coupled to the gear system 13.

Referring now to FIGS. 1–4 and 6, the pivoting support frame 3 is also provided in the form of a plate, and has a hinge pin 30 provided along a first end 33 of the pivoting support frame 3, a pair of gripping arms 32 extending from a second end 34 opposite the first end 33, and a slide projecting tab 31 provided along a side 35 that interconnects the first and second ends of the pivoting support frame 3. In particular, the slide projecting tab 31 projects from the side 35 of the pivoting support frame 3 that is adjacent to the side 23 of the slider 2 along which the wedge block 22 and the pressing tab 21 are provided. The hinge pin 30 is received and pivots inside the pin-hinge frame 12, and the pivoting support frame 3 extends through the clamp opening 10 of the substrate 1 using the hinge pin 30 as the pivot axis. The pivoting support frame 3 extends through the clamp opening 10 and into the disk receiving space DRS.

Figure 7:
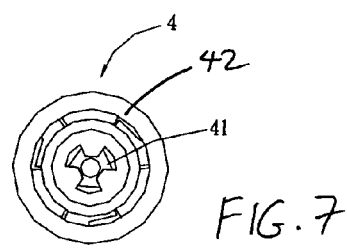
FIG. 7 is a top plan view of the gripping plate of the clamping device of the present invention.
Figure 8:
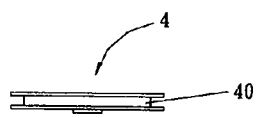
FIG. 8 is a side plan view of the gripping plate of FIG. 7.

Referring to FIGS. 7 and 8, the gripping plate 4 has an annular guide groove 40 extending along its circumference, and a plurality of fit-in slots 41 provided on an upper surface 42 of the gripping plate 4. The slots 41 extend at one or more specific inclination angles. The gripping arms 32 of the pivoting support frame 3 extend into the annular guide groove 40 to retain the gripping plate 4 within the grasp of the gripping arms 32 in a manner which allows the gripping plate 4 to be rotated while retained by the gripping arms 32. A magnet (not shown) and a projecting part (not shown) are provided on the upper surface 42 and the lower surface, respectively, of the gripping plate 4 to reinforce the stability of gripping plate 4.

Figure 1:
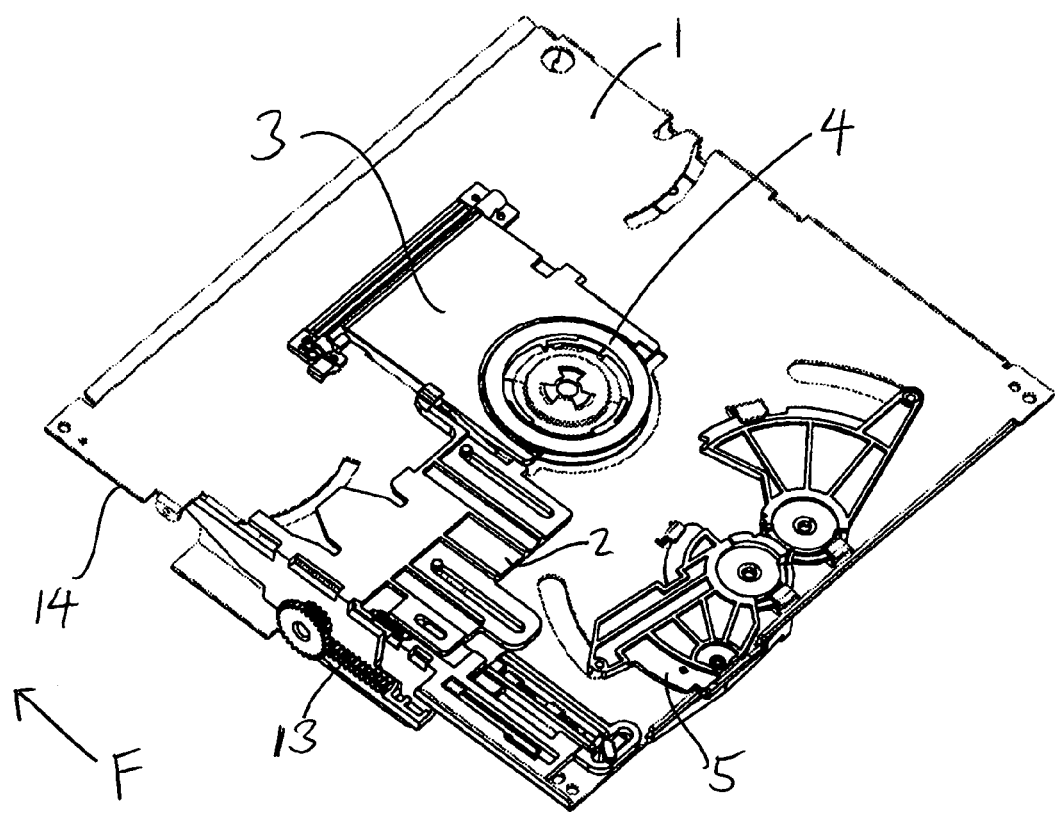
FIG. 1 is a perspective view of the substrate and related internal components of an optical disk player that utilizes a clamping device according to the present invention, shown before the disk is inserted.
Figure 2:
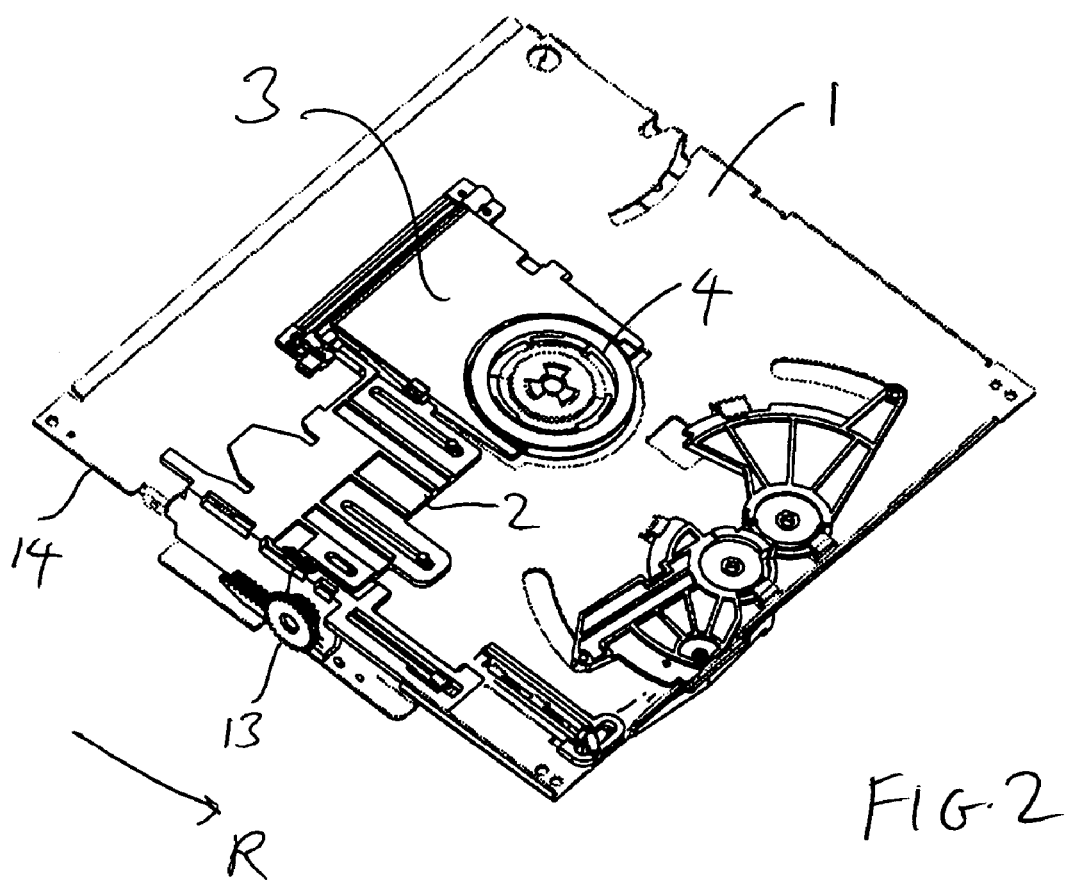
FIG. 2 is a perspective view of the substrate and related internal components of the optical disk player of FIG. 1 shown after the disk has been inserted.
Figure 3:
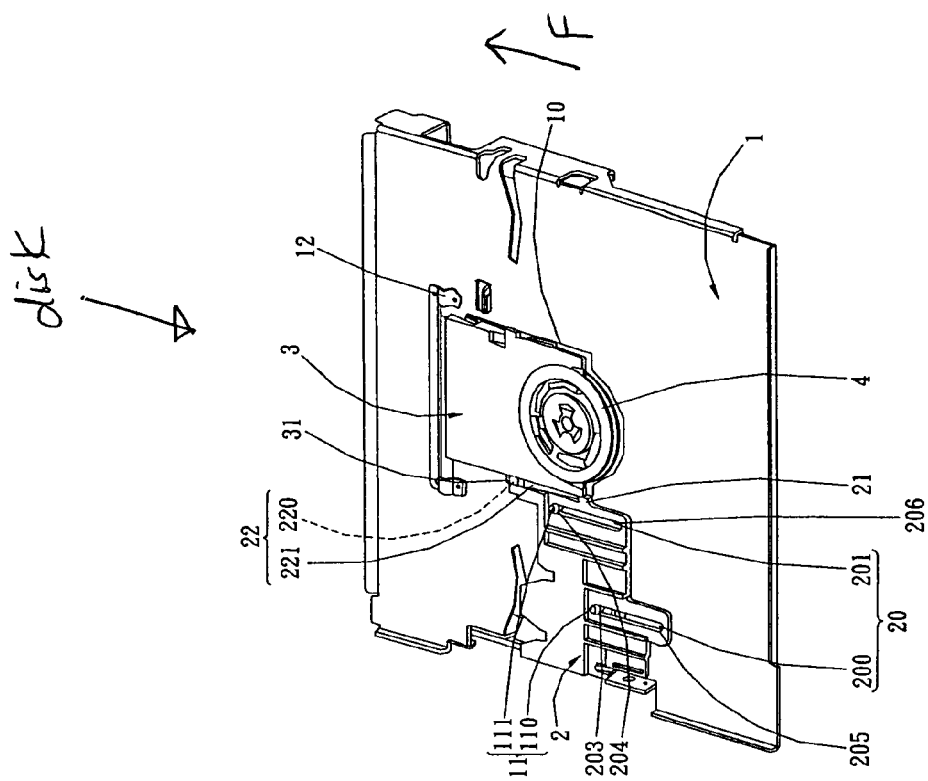
FIG. 3 is another perspective view of the substrate and related internal components of the optical disk player of FIG. 1 with some elements omitted for clarity.
Figure 4:
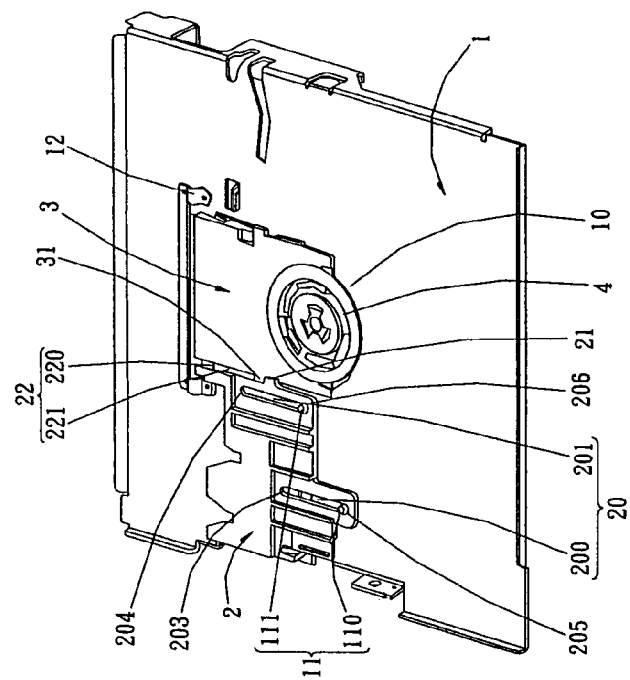
FIG. 4 is another perspective view of the substrate and related internal components of the optical disk player of FIG. 2 with some elements omitted for clarity.
Figure 5:
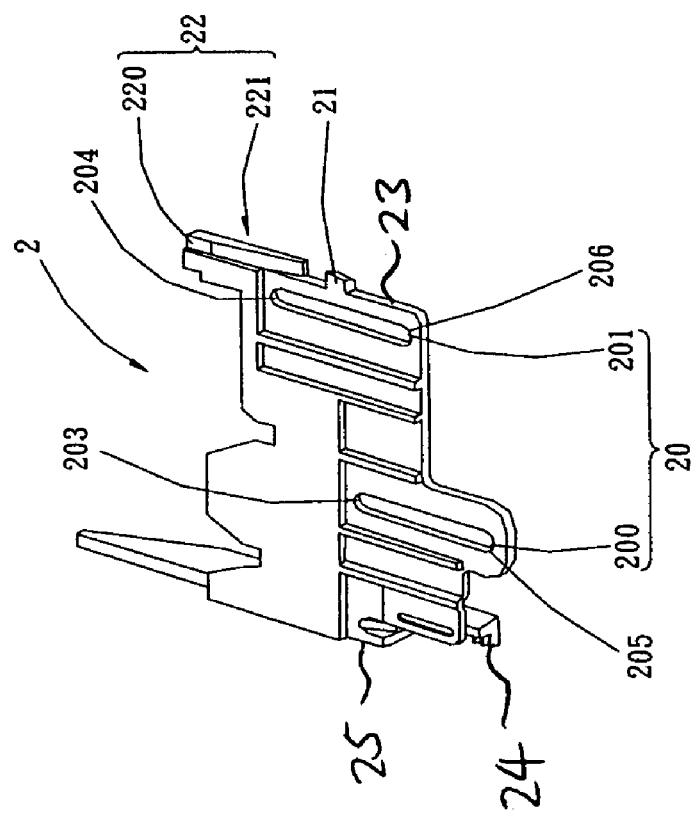
FIG. 5 is a perspective view of the slider of the clamping device of the present invention.
Figure 6:
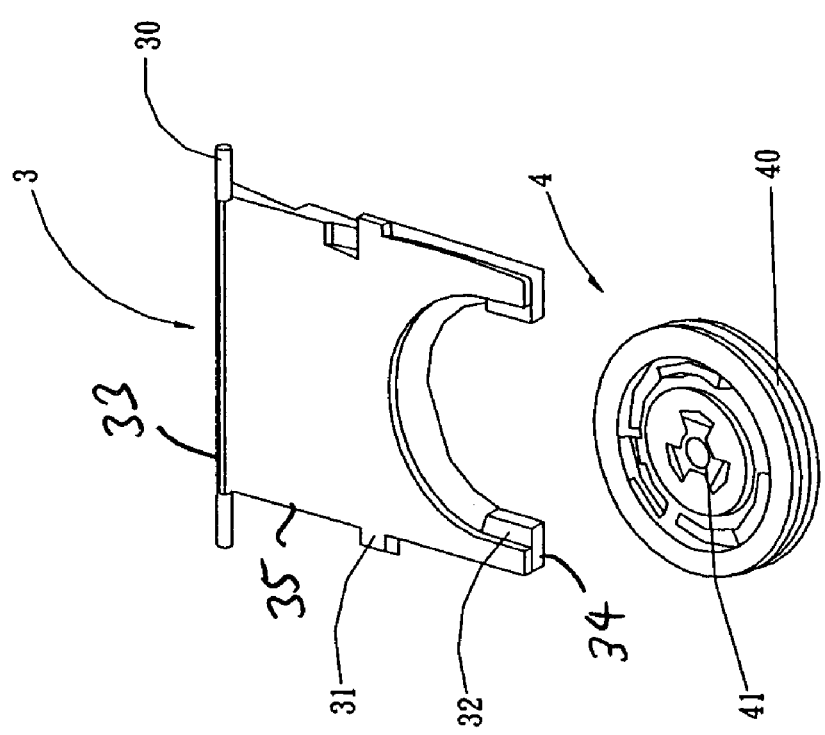
FIG. 6 is an exploded perspective view of the pivoting support frame and the gripping plate of the clamping device of the present invention.

FIGS. 1 and 3 illustrate the state of the clamping device of the present invention before an optical disk 7 is inserted. When the disk 7 is not inserted, the slider 2 assumes a first position with respect to the pivoting support frame 3, where the slide projecting tab 31 of the pivoting support frame 3 is seated on the sliding top surface 220 of the wedge block 22 of the slider 2. This prevents the pivoting support frame 3 from pivoting downwardly (when viewed from the orientations of FIGS. 1–4) through the clamp opening 10 into the disk receiving space DRS towards the turntable 6, which might damage the internal structure of the optical disk player. In addition, when the slider 2 is in the first position, the first fixed guide rod 110 and the second fixed guide rod 111 are positioned adjacent the front ends 203 and 204, respectively, of the guide slots 200 and 201, respectively.

When an optical disk 7 is inserted, before the disk 7 can be read, the optical disk player must fix the disk 7 onto the turntable 6. At this time, the gear system 13 moves the slider 2 (via the engagement with the hooked piece 24 in a manner that is well-known in the art) in the direction of the arrow F (shown in FIGS. 1 and 3) with respect to the substrate 1. As the slider 2 moves, the first fixed guide rod 110 and the second fixed guide rod 111 appear to experience relative movement from the front ends 203 and 204, respectively, of the first guide slot 200 and the second guide slot 201, respectively, towards the rear ends 205 and 206, respectively. However, only the slider 2 experiences actual movement since the first fixed guide rod 110 and the second fixed guide rod 111 are fixed on the substrate 1. In addition, as the slider 2 moves, the slide projecting tab 31 of the pivoting support frame 3 experiences relative sliding movement along the sliding top surface 220, and then along the angled surface 221. Again, only the slider 2 (and its wedge block 22) experiences actual movement since the pivoting support frame 3 cannot move in the horizontal directions shown by the arrows F and R. At this time, the pressing tab 21 will slide over the top surface of the pivoting support frame 3 to prevent the pivoting support frame 3 from pivoting upwardly (when viewed from the orientations of FIGS. 1–4). Since the angled surface 221 experiences a change in elevation when compared with the sliding top surface 220, the pivoting support frame 3 will slowly pivot (about the axis of the hinge pin 30) downwardly towards the optical disk 7.

As the slider 2 continues its movement in the direction of arrow F, the height or elevational difference between the angled surface 221 and the sliding top surface 220 gradually increases, thereby leading to a gradual increase in the pivot angle of the pivoting support frame 3. When the slider 2 reaches a second position (see FIGS. 2 and 4), the height or elevational difference between the angled surface 221 and the sliding top surface 220 will be greatest, and the pivot angle of the pivoting support frame 3 will also be greatest. In this second position, the gripping plate 4 completely fixes the optical disk 7 on to the turntable 6. In addition, in this second position, the first fixed guide rod 110 and the second fixed guide rod 111 will abut the rear ends 205 and 206 of the first guide slot 200 and the second guide slot 201, respectively, which act as stop members to prevent further movement of the slider 2. Also, in this second position, the pressing tab 21 of the slider 2 presses the pivoting support frame 3 downwards to further secure the pivoting support frame 3 and the optical disk 7. The optical disk 7 and the turntable 6 can be further secured by using a magnet (not shown) and a projecting part (not shown) to prevent the optical disk 7 from escaping when the optical disk player is in use. The use of the magnet and the projecting part is conventional in the art and will not be described in greater detail herein.

To eject the optical disk 7 from the optical disk player, it is necessary to separate the pivoting support frame 3 from the optical disk 7. The operation is opposite to that described above for fixing the optical disk 7. First, the gear system 13 causes the slider 2 to move in the direction of the arrow R (see FIGS. 2 and 4), and the first fixed guide rod 110 and the second fixed guide rod 111 appear to experience relative movement from the rear ends 205 and 206, respectively, of the first guide slot 200 and the second guide slot 201, respectively, to the front ends 203 and 204, respectively, which act as stop members to limit the movement of the slider 2 in the direction of the arrow R. At the same time, the slide projecting tab 31 begins to slide upwardly along the angled surface 221 to cause the pivoting support frame 3 to be gradually pivoted upwardly (i.e., away from the optical disk 7). The slider 2 continues to move until it reaches the first position, where the first fixed guide rod 110 and the second fixed guide rod 111 abut against the front ends 203 and 204, respectively, of the first guide slot 200 and the second guide slot 201, respectively. At this first position, the slide projecting tab 31 of the pivoting support frame 3 slides back to the sliding top surface 220, as shown in FIGS. 1 and 3, and the pressing tab 21 becomes disengaged from the top surface of the pivoting support frame 3.

Thus, the present invention uses the pressing tab 21 of the slider 2 to (i) limit the upward pivoting of the pivoting support frame 3, (ii) ensure the gripping operation of gripping plate 4, and (iii) increase the stability of the gripping plate 4, when the optical disk 7 is fixed to the turntable 6 during rotation of the disk 7.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An optical disk player, comprising:
   a substrate having an opening;
   a turntable;
   a disk receiving space defined between the substrate and the turntable;
   a support frame that is pivotably coupled to the substrate;
   a gripping plate carried on the support frame and extending into the opening; and
   a slider coupled for slidable movement on the substrate, the slider having a pressing tab that presses the gripping plate through the opening and into the disk receiving space when a disk is received inside the disk receiving space.

2. The player of claim 1, wherein the support frame has a projecting tab, and wherein the slider has a block with an angled surface along which the projecting tab travels when the slider is moved.

3. The player of claim 2, wherein the slider has a side, and the angled surface and the pressing tab are provided along the same side.

4. The player of claim 1, wherein the substrate has a fixed pin, and the slider has a slot which receives the pin.

5. The player of claim 1, wherein the pressing tab releasably engages the gripping plate.

6. An optical disk player, comprising:
   a substrate having an opening;
   a support frame that is pivotably coupled to the substrate, the support frame having a projecting tab;
   a gripping plate carried on the support frame and extending into the opening; and
   a slider coupled for slidable movement on the substrate, the slider having a block with an angled surface along which the projecting tab travels when the slider is moved;
   wherein the slider assumes a first position when an optical disk is not retained in the disk retaining space and the slider assumes a second position when an optical disk is retained in the disk retaining space; and
   wherein the block has a top surface that extends from the angled surface with the projecting tab positioned along the top surface of the block when the slider is in the first position.

7. The player of claim 6, wherein the substrate has a fixed pin, and the slider has a slot which receives the pin.

8. The player of claim 6, wherein the support frame is pivoted as the projecting tab travels along the angled surface.

9. The player of claim 6, wherein the angled surface has a top portion and a bottom portion, wherein the projecting tab is positioned at the bottom portion of the angled surface when the slider is in the second position.

10. A clamping device for an optical disk player, comprising:
    a substrate having an opening;
    a support frame that is pivotably coupled to the substrate, the support frame having a projecting tab;
    a gripping plate carried on the support frame and extending into the opening; and
    a slider coupled for slidable movement on the substrate, the slider having:
      a block with an angled surface along which the projecting tab travels when the slider is moved, and
      a pressing tab that releasably presses the gripping plate through the opening.

11. The device of claim 10, wherein the slider has a side, and the angled surface and the pressing tab are provided along the same side.

12. The device of claim 10, wherein the substrate has a fixed pin, and the slider has a slot which receives the pin.

13. The device of claim 10, wherein the support frame is pivoted as the projecting tab travels along the angled surface.

14. The device of claim 10, wherein the slider assumes a first position when an optical disk is not retained by the clamping device, and the slider assumes a second position when an optical disk is retained by the clamping device.

15. The device of claim 14, wherein the block has a top surface that extends from the angled surface, with the projecting tab positioned along the top surface of the block when the slider is in the first position.

16. The device of claim 14, wherein the angled surface has a top portion and a bottom portion, wherein the projecting tab is positioned at the bottom portion of the angled surface when the slider is in the second position.

* * * * *